United States Patent
Muller et al.

(10) Patent No.: US 8,683,815 B2
(45) Date of Patent: Apr. 1, 2014

(54) MAGNETOCALORIC ELEMENT

(75) Inventors: Christian Muller, Strasbourg (FR); Jean-Claude Heitzler, Horbourg-Wihr (FR); Jean-Luc Hamm, Kuttolsheim (FR)

(73) Assignee: Cooltech Applications Societe par actions simplifiee, Holtzheim (FR)

( * ) Notice: Subject to any disclaimer, the term of this patent is extended or adjusted under 35 U.S.C. 154(b) by 301 days.

(21) Appl. No.: 13/120,689

(22) PCT Filed: Sep. 23, 2009

(86) PCT No.: PCT/FR2009/001128
§ 371 (c)(1),
(2), (4) Date: Mar. 24, 2011

(87) PCT Pub. No.: WO2010/034907
PCT Pub. Date: Apr. 1, 2010

(65) Prior Publication Data
US 2011/0173993 A1    Jul. 21, 2011

(30) Foreign Application Priority Data
Sep. 25, 2008 (FR) .................................. 08 05280

(51) Int. Cl.
*F25B 21/00* (2006.01)

(52) U.S. Cl.
USPC .................................. 62/3.1; 62/3.7; 62/467

(58) Field of Classification Search
USPC .............................. 62/3.1, 3.7, 447
See application file for complete search history.

(56) References Cited

U.S. PATENT DOCUMENTS

| | | | |
|---|---|---|---|
| 4,332,135 A * | 6/1982 | Barclay et al. | 62/3.1 |
| 4,916,907 A * | 4/1990 | Munk et al. | 62/3.1 |
| 6,826,915 B2 * | 12/2004 | Wada et al. | 62/3.1 |
| 2002/0124561 A1 | 9/2002 | Ban et al. | |
| 2007/0186560 A1 | 8/2007 | Schauwecker et al. | |

* cited by examiner

*Primary Examiner* — Cassey D Bauer
(74) *Attorney, Agent, or Firm* — Davis & Bujold, PLLC; Michael J. Bujold (57) ABSTRACT

A magnetocaloric element (1) made by an alignment of at least two adjacent sets (MC1-10) of magnetocaloric materials having different Curie temperatures. The magnetocaloric materials within a same set (MC1-10) have the same Curie temperature. The sets (MC1-10) are arranged according to an increasing Curie temperature, and the magnetocaloric element (1) comprises elements (MA1-2) for initiating a temperature gradient between a hot end (6) and an opposed cold end (7) of the magnetocaloric element (1).

16 Claims, 8 Drawing Sheets

MAGNETOCALORIC ELEMENT

This application is a National Stage completion of PCT/FR2009/001128 filed Sep. 23, 2009, which claims priority from French patent application Ser. No. 08/05280 filed Sep. 25, 2008.

FIELD OF THE INVENTION

The present invention relates to a magnetocaloric element made of an alignment of at least two adjacent sets of magnetocaloric materials having a different Curie temperature. Such a set is preferably intended for being integrated in a heat generator.

BACKGROUND OF THE INVENTION

Magnetic refrigeration technology at ambient temperature has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

The choice of the magnetocaloric materials determine and has a direct effect on the performances of a magnetocaloric heat generator. The magnetocaloric effect reaches its maximum in the neighbourhood of the Curie temperature of the magnetocaloric materials in their phase transition zone. Now, the materials have either a first-order phase transition and have a high magnetocaloric efficiency that is limited on a narrow temperature range around the Curie temperature, or they have a second-order phase transition with a lower efficiency, but on a wider temperature range. Now, a particular difficulty consists in producing a magnetocaloric generator that can operate with a high efficiency in a wire temperature range in order to adapt the temperature levels of the generator to the external temperatures.

Many magnetocaloric heat generators use the magnetocaloric effect of magnetocaloric materials by circulating a heat transfer fluid along or through the magnetocaloric materials, in two opposite directions, according to the magnetization and demagnetization cycles of the magnetocaloric materials. The used fluid is also intended for a thermal exchange of its calories and/or frigories with an external circuit. At the time of starting a heat generator using magnetocaloric material, the fluid circulation allows obtaining a temperature gradient between the opposite ends of the magnetocaloric material. Obtaining this temperature gradient depends on the initial temperature and on the flow rate of the heat transfer fluid, on the intensity of the magnetocaloric effect, on the Curie temperature and on the length of the magnetocaloric material. The closer the initial temperature and the Curie temperature of the magnetocaloric material, the faster a temperature gradient will be reached as from which the generator will be functional and able to produce or exchange thermal energy with an external circuit. But the initial temperature of the heat transfer fluid is not controlled and is equal to the temperature outside of the generator, and it thus can lie in a very wide range of temperature, for example between −20 and +60° C. In these conditions, the magnetocaloric materials must be chosen in function of their Curie temperatures and of the environment in which the generator will be integrated or will operate. To increase the efficiency, this requires, for a given application, to produce a generator for each environment type.

A solution to limit the number of specific generators to be provided consists in using magnetocaloric materials having a wide transition zone, namely materials with a second-order phase transition. But the magnetocaloric effect of these materials is low, and this limits the interest of this solution, since it does not allow obtaining an acceptable generator efficiency.

Another suggestion consists in integrating several magnetocaloric materials with first-order phase transition in the generator. However, this solution shows disadvantages linked with the small transition zone of these materials, since the magnetocaloric effect of some of these materials cannot take place if the temperature of the heat transfer fluid never reaches the transition zone of these materials. Furthermore, the time required to reach a temperature gradient between the hot and cold ends of the magnetocaloric element may be long because of the multiplicity of the materials used.

SUMMARY OF THE INVENTION

The present invention aims to overcome these disadvantages by offering a magnetocaloric set that enables the generation of a thermal flux and that is liable to be integrated in a heat generator that can operate in any kind of environment from a temperature point of view, in which the time required to reach the functional level of the generator, that is to say to obtain a determined temperature gradient between the opposite ends of the magnetocaloric element(s) of the generator is reduced and, finally, that supplies an efficiency suitable for an application such as heating, air-conditioning, tempering, cooling for example.

For this purpose, the invention concerns a magnetocaloric element in which the magnetocaloric materials within a same set have the same Curie temperature, in that the sets are arranged according to an increasing Curie temperature and in that the magnetocaloric element includes the means for initiating a temperature gradient between the two opposite hot and cold ends of the magnetocaloric element.

The goal of the initiating means is to speed up the creation of the temperature gradient between the two opposite ends of the magnetocaloric element in order to quickly reach an established operating rate, these opposite ends being made of the end sets of the magnetocaloric element.

The term set designates as well a succession of elements assembled to each other as a structure all in one piece, both of them being liable to be crossed by heat transfer fluid.

According to the invention, the initiating means can be made of magnetocaloric materials with a larger transition zone than that of the magnetocaloric materials making up the sets.

Furthermore, the magnetocaloric materials making up the sets may have a first-order phase transition and the magnetocaloric materials making up the initiating means may have a second-order phase transition.

In a first embodiment of the invention, each set can be made of a superposition of small plates out of magnetocaloric material spaced from each other to allow the heat transfer fluid to flow through the set.

The magnetocaloric materials that make up the initiating means can then have the shape of at least one plate integrated transversally in and/or along at least one set out of magnetocaloric material and whose transition zone covers the Curie temperature of the set(s).

As a variant, at least one set can include initiating means in the form of at least two plates out of magnetocaloric material aligned and integrated transversally in and/or along the set and the transition zone of the assembly made up by the plates can cover the Curie temperature of the set.

According to another variant, the magnetocaloric materials that make up the initiating means can be in the form of at least one plate integrated transversally in and/or along two sets out of magnetocaloric material and made up of the same magnetocaloric material as that of one of the two sets.

According to another variant, which allows to initiate the initiating means among themselves, the magnetocaloric materials making up the initiating means can be in the form of at least two parallel plates, each integrated transversally in and/or along at least two sets, so that the plates are adjacent among themselves in at least one of the sets and the transition zone of each plate can cover the Curie temperature of the sets in which it is integrated.

In a second embodiment of the invention, each set can be made up of a porous piece out of magnetocaloric material.

In this configuration, the magnetocaloric materials making up the initiating means can be in the form of at least one small bar integrated approximately transversally in at least one set out of magnetocaloric material.

The invention also concerns a magnetocaloric heat generator including at least one magnetocaloric element, at least one magnetic arrangement arranged to submit the magnetocaloric element to a magnetic field variation and to create alternately in this magnetocaloric element a heating cycle and a cooling cycle, and a heat transfer fluid circulated in an alternating way through the magnetocaloric element in a direction approximately perpendicular to the sets and synchronized with the magnetic field variation, in order to create and maintain a temperature gradient between the opposite hot and cold ends of the magnetocaloric element, this generator being characterized in that the magnetocaloric element is built in accordance with the above description.

BRIEF DESCRIPTION OF THE DRAWINGS

The present invention and its advantages will be better revealed in the following description of several embodiments given as non limiting examples, in reference to the drawings in appendix, in which.

DETAILED DESCRIPTION OF THE PREFERRED EMBODIMENTS

In the implementation examples shown, the identical parts or sections have the same numerical references.

Figure 1:
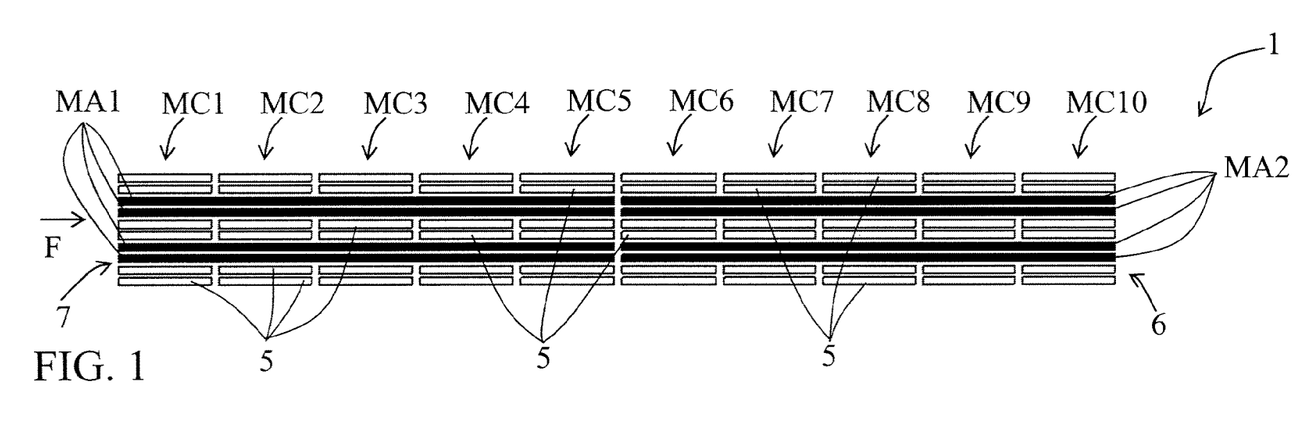
FIG. 1 is a plane view of a magnetocaloric element according to a first variant of a first embodiment of the invention.

In reference to FIG. 1, the magnetocaloric element 1 represents a first variant of a first embodiment of the invention and is intended to be integrated in a magnetocaloric heat generator. It is made up of ten sets MC1-10 of small plates 5 of magnetocaloric material. In this first embodiment, each set MC1-10 made out of different magnetocaloric material is made up of an assembly of identical small plates 5.

In each set MC1-10, these small plates 5 are spaced from each other to allow heat transfer fluid to circulate between two adjacent small plates 5 and to exchange thermal energy with the latter. For that purpose, a spacing or separating device (not represented), which ensures a space for the passage of the heat transfer fluid, can separate the small plates 5 two by two. The fluid circulation direction is represented by arrow F in FIG. 1.

The sets MC1-10 are arranged according to an increasing Curie temperature.

The magnetocaloric elements 1, 10, 20 and 30 represented respectively in FIGS. 1 to 4 are made of the same sets MC1 to MC10 of magnetocaloric materials. As an example, the Curie temperature of the MC1 materials is −18.5° C., that of the MC2 materials is −9.1° C., that of the MC3 materials is 1.2° C., that of the MC4 materials is 14.1° C. and that of the MC5 materials is 29.5° C. Using magnetocaloric materials with various Curie temperatures allows increasing the application possibilities of the heat generator in which the magnetocaloric element according to the invention is integrated, this generator being then able to operate in a wide temperature range and to have a high thermal power.

When the magnetocaloric element 1, 10, 20, 30, 40, 50, 60, 70, 80, 90 according to the invention is integrated in a heat generator (not represented), a magnetic arrangement is arranged to submit the sets MC1-21 and MA1-34 to a magnetic field variation and to create alternately in the latter a heating cycle and a cooling cycle. The heat transfer fluid is moved in a way synchronized with these cycles, and alternately according to a reciprocating movement, to create and to maintain a temperature gradient between the two opposite hot 6 and cold 7 ends of the magnetocaloric element 1, 10, 20, 30, 40, 50, 60, 70, 80, 90.

A heat generator integrating such a magnetocaloric element 1, 10, 20, 30, 40, 50, 60, 70, 80, 90 is meant to return the thermal energy produced by the magnetocaloric element 1, 10, 20, 30, 40, 50, 60, 70, 80, 90 and, more specifically, by the magnetocaloric materials it contains, to one or several external circuits. This restitution takes place through a heat exchange with the heat transfer fluid. When the temperature gradient is reached, the magnetocaloric element 1, 10, 20, 30, 40, 50, 60, 70, 80, 90 operates at an established rate. This implies that the faster this gradient is reached, the faster the heat generator is operational.

To shorten the time required to obtain this temperature gradient, the magnetocaloric element 1 represented in FIG. 1 integrates initiating means implemented in the form of eight plates MA1 and MA2 associated two by two and inserted, making up lines, in five sets MC1 to MC5 and MC6 to MC10, while two pairs of plates MA1 or MA2 are separated among themselves by two lines of small plates 5 making up the sets MC1 to MC5 and MC6 to MC10 respectively. The material making up the plates MA1 integrated in the five sets MC1 to MC5 has a transition zone that is wider than that of the materials making up the sets and that covers the whole of the Curie temperatures of the materials. The MA1 material has been selected for its Curie temperature of 5.5° C. and its transition zone or range of 60° C.; this is a second-order transition phase material. Conversely, the materials of the sets MC1 to MC5 are first-order transition phase materials that have a higher magnetocaloric effect, but only around their Curie temperature (range of about 12° C.).

So, in the first five sets MC1 to MC5 of the magnetocaloric element 1, the material making up the plates MA1 will be active in a temperature range located between −25° C. and +35° C. Thus, the temperature of the heat transfer fluid when starting up must simply be within this very wide range. The circulation of the heat transfer fluid through these sets MC1 to MC5 and the magnetic field variation will allow creating a temperature gradient between the ends of the initiating plates MA1 which will allow, by heat conduction and convection, to reach very quickly the Curie temperature of each material making up the sets MC1 to MC5, to make use of the magnetocaloric abilities of the latter.

Likely, the magnetocaloric materials of the five following sets MC6 to MC10 also comprise an increasing Curie temperature and are first-order phase transition materials. The plates MA2 that make up the initiating means of these five sets MC6 to MC10 are made out of a magnetocaloric material with a transition zone covering the Curie temperatures of the materials of the sets MC6 to MC10, which allows reaching faster a temperature gradient that allows the generator to be functional or to operate at an established rate.

So, the juxtaposition of several sets of magnetocaloric material with an increasing Curie temperature allows achieving a high temperature gradient between the ends of a same magnetocaloric element, and thus obtaining a high efficiency. The integration of means to initiate this temperature gradient allows reaching an established operating rate faster. A heat generator integrating a magnetocaloric element 1 according to the present invention reaches thus very quickly a high efficiency.

Figure 2:
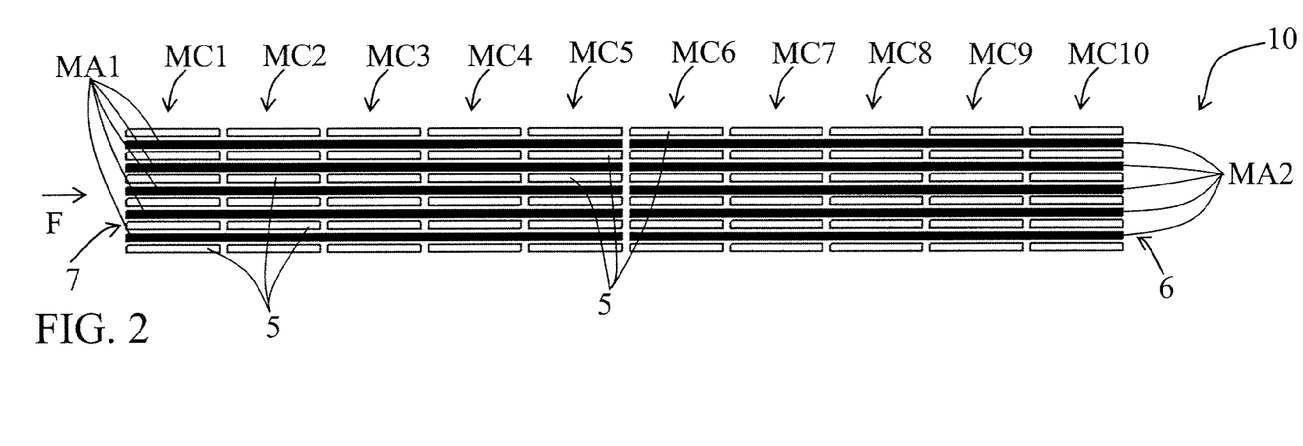
FIG. 2 is a plane view of a magnetocaloric element according to a second variant of the first embodiment of the invention.

FIG. 2 represents a second implementation variant of the invention in which the magnetocaloric element 10 is made of ten sets MC1 to MC10 of small plates 5 manufactured of the same materials as those of the magnetocaloric element 1 described previously, of the first-order transition type and having an increasing Curie temperature.

In this magnetocaloric element 10, the initiation means are also in the form of plates MA1 and MA2. The plates MA1 form a line integrated in five sets MC1 to MC5 and the plates MA2 form a line integrated in five sets MC6 to MC10 of the magnetocaloric element 10. These plates MA1 and MA2 are located alternately with material lines forming the magnetocaloric element 10, that is to say separated among them by a material line forming the sets MC1 to MC10.

The initiating means are manufactured of the same materials as those of the magnetocaloric element 1 represented in FIG. 1, since they are associated with the same sets MC1 to MC10, which are manufactured of the same materials.

The same advantages as those described with respect to the magnetocaloric element 1 apply to this magnetocaloric element 10: during the start-up phase of the magnetocaloric element 10, the materials of the sets MC1 to MC10, for which the heat transfer fluid temperature is located within the transition zone of the latter, and the initiating plates MA1 and MA2 are subjected to heating and cooling cycles, while the initiating plates MA1 and MA2 generate a temperature gradient between their two ends that allows, thanks to the thermal conduction and convection, to activate faster the materials of the sets MC1 to MC10 for which the heat transfer fluid does not present, when starting up, a temperature located within their transition zone.

Figure 3:
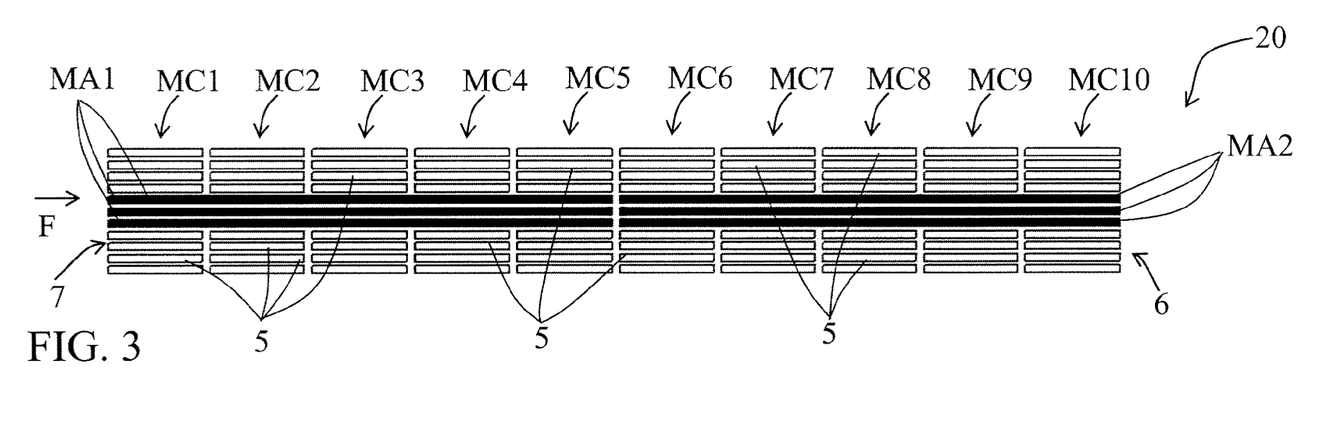
FIG. 3 is a plane view of a magnetocaloric element according to a third variant of the first embodiment of the invention.

FIG. 3 represents a third variant of embodiment of the invention, in which the magnetocaloric element 20 is made up of ten sets MC1 to MC10 of small plates 5 manufactured of the same materials as those used for the magnetocaloric element 1, of the first-order transition type and comprising an increasing Curie temperature.

In this magnetocaloric element 20, the initiating means are in the form of two sets made up of three small plates MA1 and MA2 integrated in the magnetocaloric element 20.

Again, these initiating means MA1 and MA2 are manufactured of the same materials as those used for the magnetocaloric element 1 represented in FIG. 1, since they are associated with the same sets MC1 to MC10, which are manufactured of the same materials.

The same advantages as those described previously apply to this magnetocaloric element 20. The first set of plates MA1 of magnetocaloric material allows initiating the sets MC1 to MC5 of the magnetocaloric element 20 and the second set of plates MA2 of magnetocaloric material allows initiating the sets MC6 to MC10.

Figure 5:
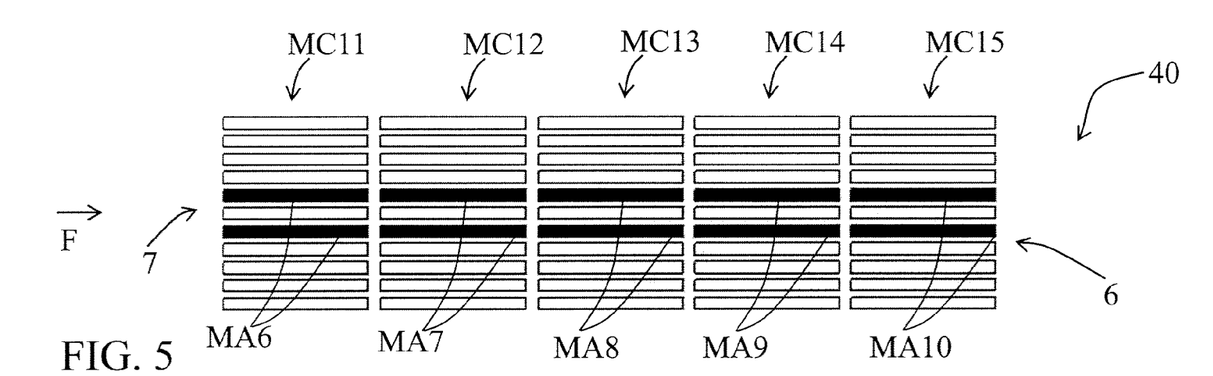
FIG. 5 is a plane view of a magnetocaloric element according to a fifth variant of the first embodiment of the invention.

With reference to FIG. 5, the magnetocaloric element 40 represented according to a fifth variant of the first embodiment of the invention is made up of five sets MC11-15 of plates 5 out of magnetocaloric material arranged according to an increasing Curie temperature. In this implementation, the heat transfer fluid circulates in the space available between the various small plates 5 in order to carry out a heat transfer with the latter. The initiation of the temperature gradient in this magnetocaloric element 40 is obtained with plates MA6 to MA10 arranged respectively in the sets MC11 to MC15 and having the same width as the small plates 5. This way, each set MC11 to MC15 has a specific initiating means. In this example of implementation, two plates of MA6-MA10 are integrated in each set MC11 to MC15. It is of course possible to integrate more plates, or only one.

Each of the plates MA6 to MA10, making up the initiating means, comprise a transition zone that covers the Curie temperature of the material of the set in which they are integrated, which allows reaching faster a temperature gradient that will allow the generator to be functional or at an established operating rate.

Figure 6:
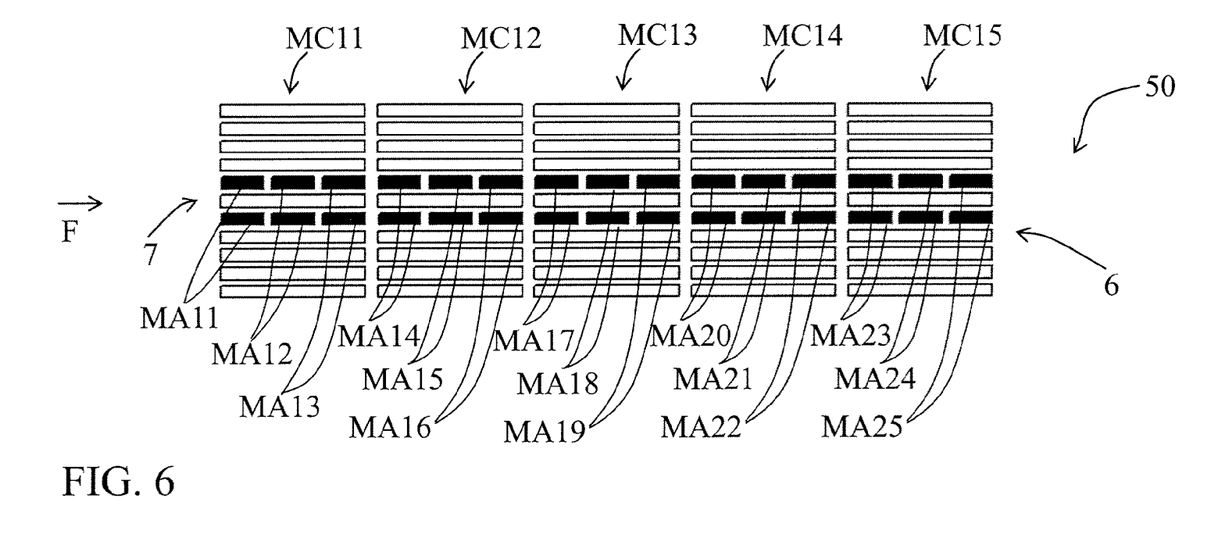
FIG. 6 is a plane view of a magnetocaloric element according to a sixth variant of the first embodiment of the invention.

The magnetocaloric element 50 represented in FIG. 6, manufactured according to a sixth variant, is made up of the same sets MC11 to MC15 of magnetocaloric materials as those of the magnetocaloric element 40 described previously. In this magnetocaloric element 50, the initiating means are made up of three plates MA11 to MA25 integrated each in a row of small plates 5 making up a set MC11-15. In this implementation, the whole of the transition zone of the three associated plates MA11 to MA25 covers the Curie temperature of the set in which they are integrated. Again, it is possible to integrate these plates MA11 to MA25 in one or several lines of small plates 5 of the sets MC11 to MC15. In this example, two lines of initiating plates MA11 to MA25 are integrated in each set MC11 to MC15.

Figure 9:
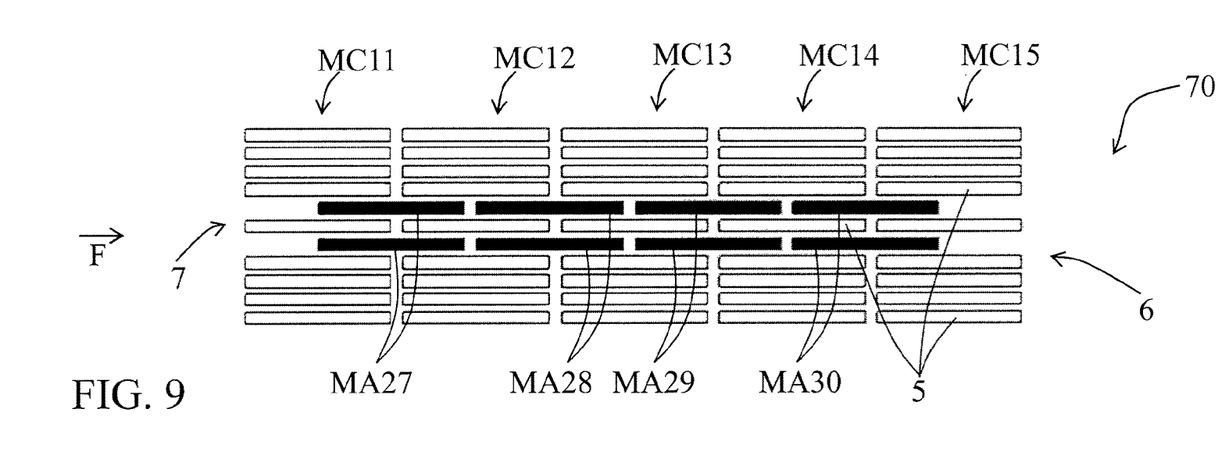
FIG. 9 is a plane view of a magnetocaloric element according to an additional variant of the first embodiment.

With reference to FIG. 9, the magnetocaloric element 70 represented according to a seventh variant of the first implementation form of the invention is also made up of the same sets MC11 to MC15 of magnetocaloric materials as those of the magnetocaloric element 40 described in connection with FIG. 5. In this implementation, the initiation of the temperature gradient is performed by plates MA27 to MA30 arranged each along two sets, respectively along the sets MC11 and MC12, MC12 and MC13, MC13 and MC14, and MC14 and MC15. Each of these plates has a width that is identical to that of the small plates 5 and is manufactured of the same magnetocaloric material as that making up one of the two sets in which they are arranged. So, in this example, the plate MA27 is made of the material making up the set MC11, the plate MA28 is made of the material making up the set MC12, the plate MA29 is made of the material making up the set MC13 and the plate MA30 is made of the material making up the set MC14. This way, each pair of sets includes a common initiating means that allows reaching faster a temperature gradient between the two ends 6 and 7 of the magnetocaloric element 70. Also in this example of implementation, two plates of MA27-MA30 are integrated in each set MC11 to MC15. It is of course possible to integrate more plates, or only one.

Figure 10:
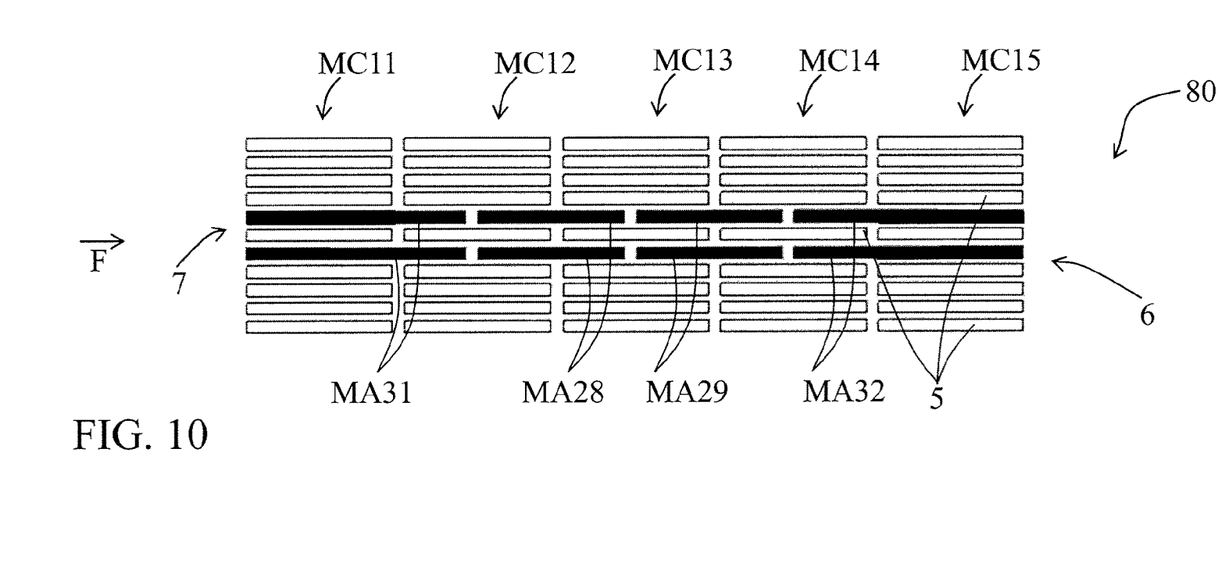
FIG. 10 is a plane view of a magnetocaloric element according to another additional variant of the first embodiment of the invention.

FIG. 10 represents a configuration of a magnetocaloric element 80 distinguishing itself from that of the previous figure by the fact that the end plates MA31 and MA32 are wider, so that all the plates MA31 and MA32 extend up to a cold end 7 or hot end 6 of the magnetocaloric element 80. This configuration allows in particular the heat transfer fluid to circulate according to a uniform flow rate through the magnetocaloric element 80.

Figure 7A:
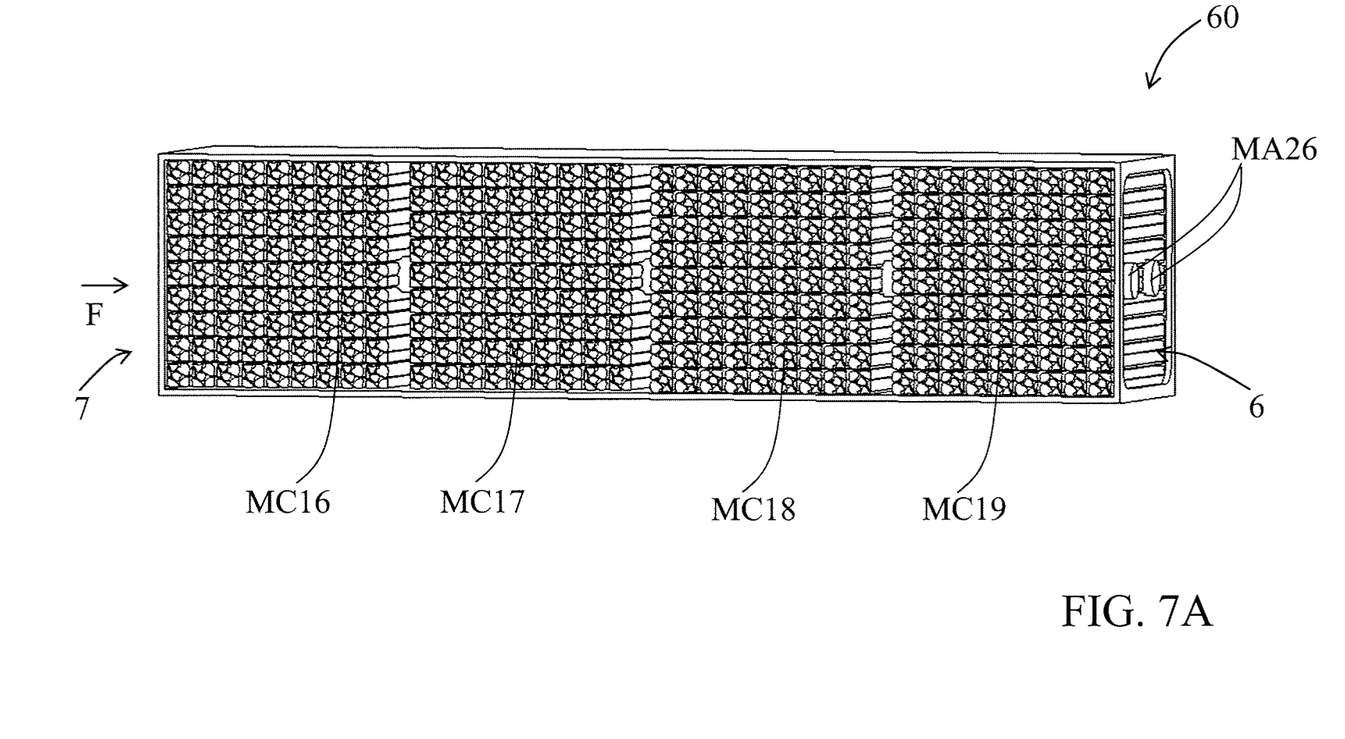
FIG. 7A is a perspective view of a magnetocaloric element according to a second embodiment of the invention.
Figure 7B:
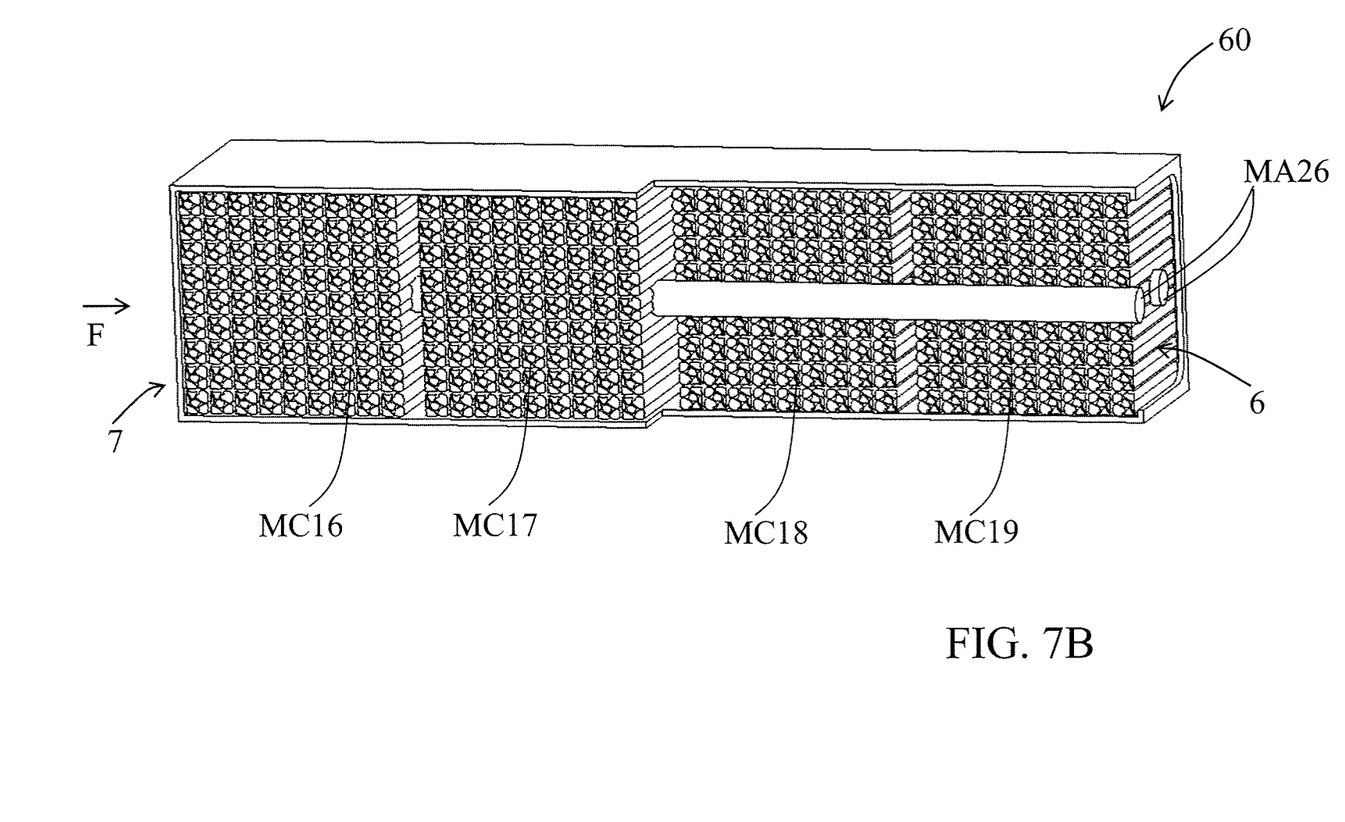
FIG. 7B is a partial section view of FIG. 7A.

FIGS. 7A and 7B represent a magnetocaloric element 60 according to a second embodiment of the invention, in which the sets MC16 to MC19 are made up each of a porous block of magnetocaloric material through which a heat transfer fluid can flow. These porous blocks MC16-19 are crossed by small bars MA26 of magnetocaloric material whose transition zone covers the Curie temperature of the porous blocks. The initiating principle is identical with that described in the first embodiment, the small bars MA26 allow obtaining within each porous block MC16-19 a temperature covered in their transition zone, so that these blocks perform, under the effect of the variable magnetic field, alternating hot and cold cycles. The duration of the start-up phase of the magnetocaloric element 60 is thus reduced. In the represented implementation, two small bars MA26 are integrated, whose transition zone covers the Curie temperature of the sets MC16 to MC19. It is of course possible to integrate more or less small bars, and this through one or several porous blocks.

BEST WAY OF CARRYING OUT THE INVENTION

Figure 4:
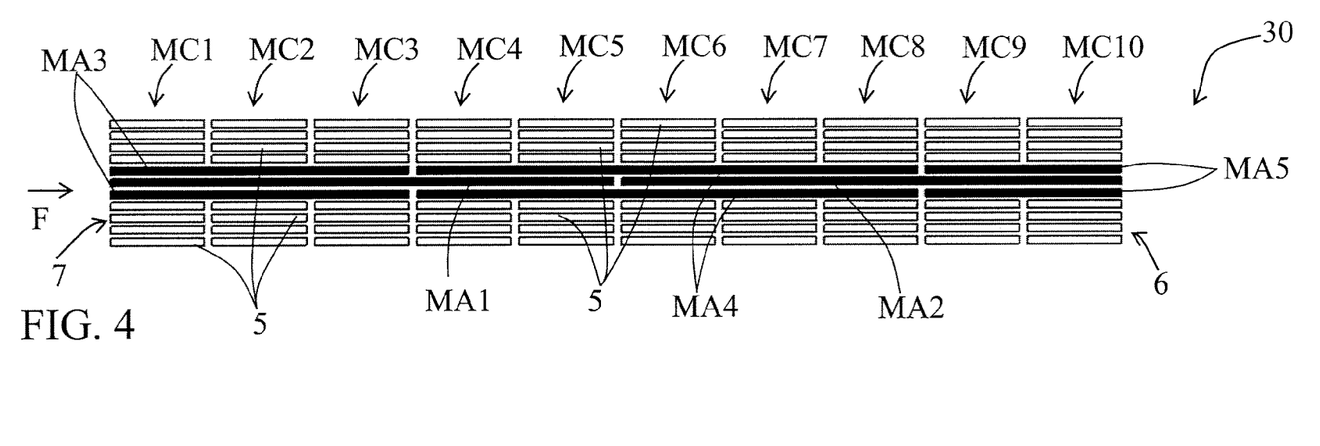
FIG. 4 is a plane view of a magnetocaloric element according to a fourth variant of the first embodiment of the invention.

The magnetocaloric element 30 represented in FIG. 4 is embodied according to the first embodiment and is made up of ten sets MC1 to MC10 of small plates 5 made out of magnetocaloric materials that are identical to those of the first-order magnetocaloric elements 1, 10 and 30 and having increasing Curie temperatures. The initiating means are also made in the form of plates MA1 to MA5 of magnetocaloric material with a second-order phase transition. These plates MA1 to MA5 are arranged in the magnetocaloric element 30 in order to build three central lines. They are made out of five different materials intended to cooperate thermally with the various materials making up the sets MC1 to MC10.

So, considering the three lines formed by these plates MA1 to MA5, the two lines located on each side of the central line are identical. They are made up of a first plate MA3 integrated in the sets MC1, MC2 and MC3 and made out of a material whose transition zone covers the Curie temperatures of the materials making up the sets, a second plate MA4 integrated in the sets MC4 to MC8 and made out of a material whose transition zone covers the Curie temperatures of the materials making up the sets, and finally a third plate MA5 integrated in the sets MC9 and MC10 and also made out of a material whose transition zone covers the Curie temperatures of the materials making up the sets. The central line is made up of a first plate MA1 integrated in the sets MC1 to MC5 and made out of a material whose transition zone covers the Curie temperatures of the materials making up the sets and of a second plate MA2 integrated in the sets MC6 to MC10. Since the materials making up the small plates 5 of the sets MC1 to MC10 are the same as those of the previous examples of implementation, the two small plates MA1 and MA2 can be made out of the same materials as those of the previous small plates MA1 and MA2.

In the magnetocaloric element 30 represented in FIG. 4, the efficiency of the initiating means is increased since they also react among themselves by thermal conduction and convection. Due to this, the initiating time of the magnetocaloric element 30 is even reduced and a heat generator integrating one or more of these magnetocaloric elements 30 will reach very quickly an established operating rate.

Figure 8:
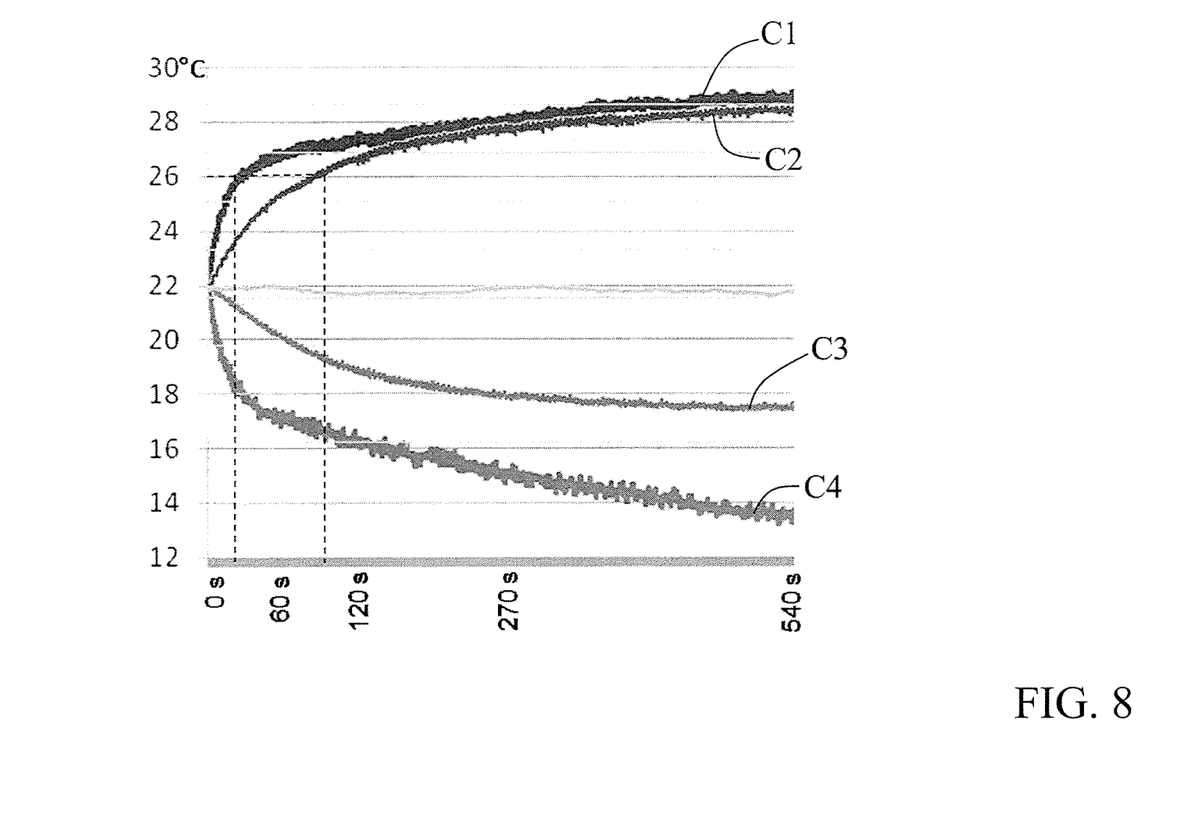
FIG. 8 is a graphic representation of the temperature curves of the hot and cold ends of the magnetocaloric element of FIG. 4.

The temperature curves represented in FIG. 8 describe this phenomenon. One notes that curve C2 represents the evolution of the temperature of the hot end MC10 of the magnetocaloric element 30 over time, before the integration of initiating means, reaches the established operating range temperature later than that of curve C1 relating to the magnetocaloric element 30 provided with initiating means. The same applies to curves C3 and C4 which represent the evolution of the temperature of the cold end MC1 in the magnetocaloric element, respectively before the integration of initiating means and the same magnetocaloric element 30 provided with the means. The integration of such initiating means thus allows reaching more rapidly an established operating rate, and this starting from various initial temperatures. One notes in particular that, to reach 26° C. on the side of the hot end 6, one hundred seconds are necessary without initiating means, and that the integration of these reduces this time to twenty seconds.

Even though, in the first embodiment of the invention, all sets MC1-10 making up the magnetocaloric element and the initiating means are made by an assembly of plates out of magnetocaloric materials, other configurations are possible, still remaining within the scope of the invention.

Furthermore, the initiating means MA1 to MA5, when they are in the form of plates, can have any width and cover at the minimum a section of a set and at the maximum all sets making up the magnetocaloric element.

Furthermore, in the examples illustrated according to the first embodiment, the various small plates 5 making up the sets MC1 to MC15 are spaced from each other to allow the heat transfer fluid to circulate between them in order to exchange thermal energy with these small plates 5. In a specific embodiment such as the one represented in FIG. 11, it can be provided that the initiating means MA33, MA34 form a spacing or separating device between two adjacent small plates 5 of a same set MC20, MC21. In this FIG. 11 the magnetocaloric element 90 comprises two adjacent sets MC20 and MC21 of magnetocaloric materials made up of small plates 5 separated by spacers forming the initiating means MA33 and MA34. The circulating direction of the fluid is represented by arrow F.

Figure 11:
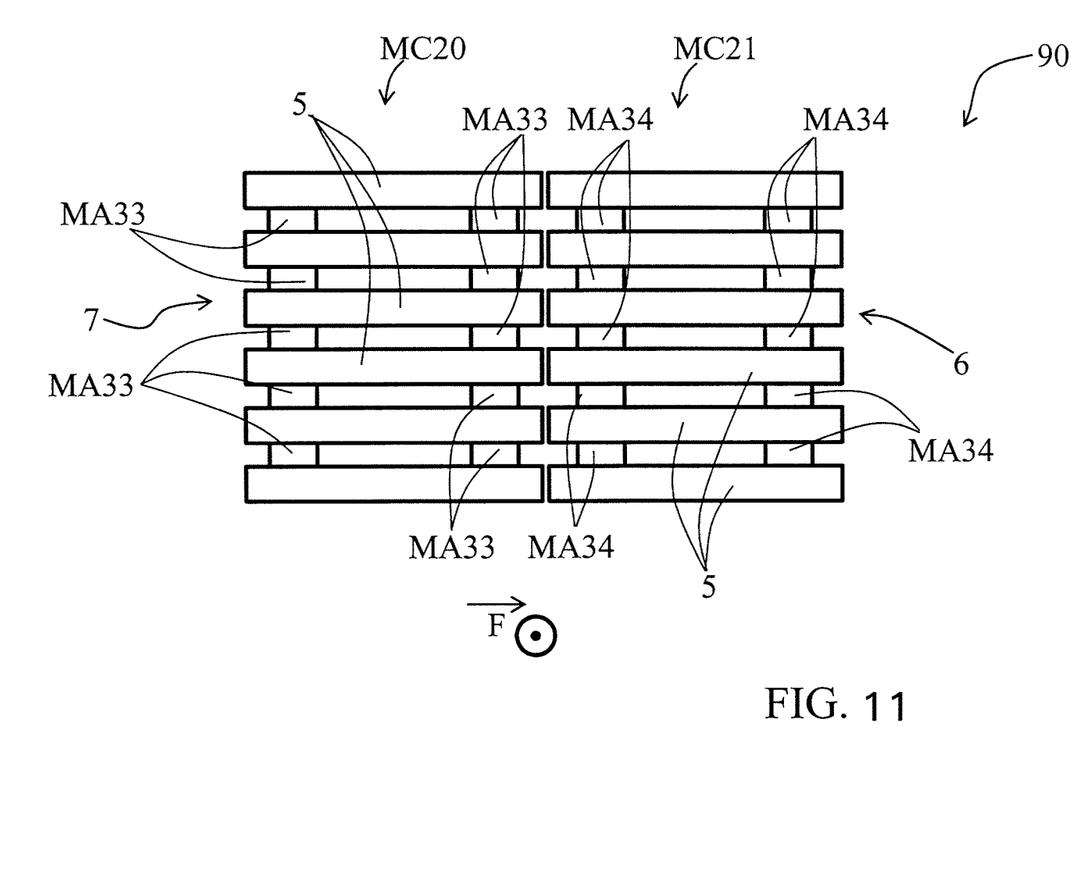
FIG. 11 is a plane view of a magnetocaloric element according to a third embodiment of the invention.

In such a configuration, the initiating means MA33, MA34 both ensure the spacing for the passage of the heat transfer fluid and perform a faster initiating of the temperature gradient, that is to say, reach faster a functional temperature gradient between the ends of the magnetocaloric element.

POSSIBLE INDUSTRIAL APPLICATIONS

This description shows clearly that the invention allows reaching the goals defined, that is to say to offer a magnetocaloric element 1, 10, 20, 30, 40, 50, 60, 70, 80, 90 generating a thermal flux, meant to be integrated in a heat generator and liable to produce very quickly a large amount of thermal energy, and this independently of the external temperature.

Furthermore, all parts making up this magnetocaloric element 1, 10, 20, 30, 40, 50, 60, 70, 80, 90 can be manufactured according to reproducible industrial processes.

A magnetocaloric element 1, 10, 20, 30, 40, 50, 60, 70, 80, 90 can find application, in industry as well domestically, in the area of heating, air conditioning, tempering, cooling or others, at competitive costs and with reduced space requirements.

The present invention is not restricted to the examples of embodiment described, but extends to any modification or variant which is obvious to a person skilled in the art while remaining within the scope of the protection defined in the attached claims.

The invention claimed is:

1. A magnetocaloric element (1, 10, 20, 30, 40, 50, 60, 70, 80, 90) comprising:
    an alignment of at least two sets (MC1-21) of magnetocaloric materials having different Curie temperatures, the at least two sets (MC1-21) being adjacent one another and the magnetocaloric materials within a same set (MC1-21) have a same Curie temperature,
    the at least two sets (MC1-21) being arranged according to an increasing Curie temperature, and
    the magnetocaloric element (1, 10, 20, 30, 40, 50, 60, 70, 80, 90) comprising an initiating element (MA1-34) for initiating a temperature gradient between two opposite hot (6) and cold (7) ends of the magnetocaloric element (1, 10, 20, 30, 40, 50, 60, 70, 80, 90), and
    the initiating element (MA1-26) comprising magnetocaloric materials which have a wider transition zone than that of the magnetocaloric materials comprising the at least two sets (MC1-19).

2. The magnetocaloric element according to claim 1, wherein the magnetocaloric materials, making up the at least two sets (MC1-19), have a first-order phase transition and the magnetocaloric materials, making up the initiating element (MA1-26), have a second-order phase transition.

3. The magnetocaloric element according to claim 1, wherein each of the at least two sets (MC1-15) is made of a superposition of small plates (5) of magnetocaloric material spaced from one another such that heat transfer fluid passes through the at least two sets (MC1-15).

4. The magnetocaloric element according to claim 3, wherein the magnetocaloric materials, making up the initiating element, are in the form of at least one plate (MA1-25) that is at least one of integrated transversely in and integrated along at least one of the at least two sets (MC1-10) of magnetocaloric material and whose transition zone covers the Curie temperature of the at least two (MC1-10).

5. The magnetocaloric element according to claim 3, wherein at least one set (MC11-15) includes the initiating element in the form of at least two plates (MA11-25) made of magnetocaloric material aligned and integrated at least one of transversely in and integrated along the least one set (MC11-15) and a transition zone of an assembly, formed by the at least two plates (MA11-25), covers the Curie temperature of the at least one set (MC11-15).

6. The magnetocaloric element according to claim 3, wherein the magnetocaloric materials, comprising the initiating element, are in the form of at least one plate (MA27-32) that is integrated at least one of transversely in and integrated along the at least two sets (MC11, MC12; MC12, MC13; MC13, MC14; MC14, MC15) made of magnetocaloric material, and formed from the same magnetocaloric material as that of one of the at least two sets (MC11, MC12; MC12, MC13; MC13, MC14; MC14, MC15).

7. The magnetocaloric element according to claim 3, wherein the magnetocaloric materials, comprising the initiating element, are at least two parallel plates (MA1-5), each of the at least two parallel plates are integrated at least one of transversely in and integrated along the at least two sets (MC1-10) such that the at least two plates (MA1-5) are adjacent one another in at least one of two sets (MC1-10) and a transition zone of each of the at least two plates (MA1-5) covers the Curie temperature of the at least two sets (MC1-10) in which the at least two parallel plates are integrated.

8. The magnetocaloric element according to claim 1, wherein each of the at least two sets (MC16-19) is formed from a porous piece of magnetocaloric material.

9. The magnetocaloric element according to claim 8, wherein the magnetocaloric materials, comprising the initiating element (MA26), are in a form of at least one small bar that is integrated approximately transversely in at least one set (MC16-19) made of magnetocaloric material.

10. The magnetocaloric element according to claim 1, wherein the initiating element (MA1-34) has a transition range that is larger than a sum of the two respective transition ranges of the magnetocaloric materials comprising the at least two sets (MC1-19).

11. The magnetocaloric element according to claim 1, wherein, with regards to a direction in which heat transfer fluid flows through the magnetocaloric element, a first portion of the initiating element (MA1-34) is axially aligned with a first one of the at least two sets (MC1-19) of magnetocaloric materials, a second portion of the initiating element (MA1-34) is axially aligned with a second one of the at least two sets (MC1-19) of magnetocaloric materials, and the first one of the at least two sets (MC1-19) of magnetocaloric materials is axially spaced from the second one of the at least two sets (MC1-19) of magnetocaloric materials.

12. The magnetocaloric element according to claim 1, wherein the initiating element (MA1-34) has a transition range that includes Curie temperatures of the magnetocaloric materials which comprises the at least two sets (MC1-19) of magnetocaloric materials having different Curie temperatures.

13. The magnetocaloric element according to claim 1, wherein the initiating element (MA1-34) has a distinct and uniform chemical composition.

14. The magnetocaloric element according to claim 1, wherein the initiating element (MA1-34) has a single Curie temperature.

15. A magnetocaloric heat generator comprising at least one magnetocaloric element, and at least one magnetic arrangement being arranged to subject the magnetocaloric element to a magnetic field variation and alternately create, in this magnetocaloric element, a heating and cooling cycle, and a heat transfer fluid circulated in an alternating way through the magnetocaloric element in a direction approximately perpendicular to the sets and synchronized with the magnetic field variation, to create and maintain a temperature gradient between opposite hot and cold ends of the magnetocaloric element, the magnetocaloric element comprising:
    an alignment of at least two sets (MC1-21) of magnetocaloric materials having different Curie temperatures, the at least two sets (MC1-21) being adjacent one another and the magnetocaloric materials within a same set (MC1-21) have a same Curie temperature,
the at least two sets (MC1-21) being arranged according to an increasing Curie temperature and the magnetocaloric element (1, 10, 20, 30, 40, 50, 60, 70, 80, 90) comprising an element (MA1-34) for initiating a temperature gradient between a hot end (6) and an opposed cold end (7) of the magnetocaloric element (1, 10, 20, 30, 40, 50, 60, 70, 80, 90).

16. A magnetocaloric element (1, 10, 20, 30, 40, 50, 60, 70, 80, 90) comprising at least first and second sets (MC1-21) of magnetocaloric material,
the first set of magnetocaloric material having a first Curie temperature and the second set of magnetocaloric material having a second Curie temperature,
the first set of magnetocaloric material being aligned and adjacent the second set of magnetocaloric material,
the first Curie temperature being lower than the second Curie temperature and an initiating element (MA1-34) comprising a magnetocaloric material with a temperature gradient between the first Curie temperature and the second Curie temperature of the magnetocaloric materials of the magnetocaloric element (1, 10, 20, 30, 40, 50, 60, 70, 80, 90).

* * * * *